United States Patent Office 2,720,523
Patented Oct. 11, 1955

2,720,523

PREGNADIENE COMPOUNDS

Harold B. MacPhillamy, Madison, N. J., assignor to Ciba Pharmaceutical Products, Inc., Summit, N. J., a corporation of New Jersey No Drawing. Application December 7, 1953,
Serial No. 396,738

5 Claims. (Cl. 260—239.5)

The present invention relates to the preparation of 3-keto-21-(1-piperidyl)-4,17-pregnadiene and the acid addition salts thereof, more particularly, the monohydrohalide salts thereof, for example, monohydrobromide, monohydrochloride, monohydroiodide, and especially 3-keto-21-(1-piperidyl)-4,17-pregnadiene monohydrobromide.

The 3-keto-21-(1-piperidyl)-4,17-pregnadiene, in the form of its salts, especially the hydrobromide, has been found active against fungi and is useful in combating Monilia fungi, more particularly, Candida tropicalis. In contrast to most antifungal agents the activity of these compounds is not impaired in the presence of serum.

In general, the compound in the form of its hydrohalide salts can be prepared by reacting a 21-halo-3-keto-4,17-pregnadiene with piperidine. By treating the salts with an alkali, the free base may be obtained. The free base may then be treated with acids to obtain any desired acid addition salts.

The preparation of the novel compounds is illustrated by the following example, in which parts by weight bear the same relationship to parts by volume as the gram to the milliliter.

*Example*

To a solution of 1.0 part by weight of 21-bromo-3-keto-4,17-pregnadiene in 10 parts by volume of benzene was added 0.3 part by weight of piperidine in 3.0 parts by volume of benzene. The combined benzene solution was allowed to stand at room temperature for about 16 hours and the resulting crystalline product filtered. It was then washed with benzene and recrystallized from acetone-methanol to yield 3-keto-21-(1-piperidyl)-4,17-pregnadiene monohydrobromide, M. P. 259–262° C.

In the same manner 21-chloro- or 21-iodo-3-keto-4,17-pregnadiene may be reacted with piperidine to obtain the monohydrochloride and monohydroiodide, respectively, of 3-keto-21-(1-piperidyl)-4,17-pregnadiene.

The 3-keto-21-(1-piperidyl)-4,17-pregnadiene monohydrohalides can be administered in any suitable manner, for example, topically, orally or parenterally.

I claim:

1. A compound selected from the group consisting of 3-keto-21-(1-piperidyl)-4,17-pregnadiene and the monohydrohalides thereof.

2. 3-keto-21-(1-piperidyl)-4,17 - pregnadiene monohydrohalides.

3. 3-keto-21-(1-piperidyl)-4,17 - pregnadiene monohydrobromide.

4. 3-keto-21-(1-piperidyl)-4,17 - pregnadiene monohydrochloride.

5. 3-keto-21-(1-piperidyl)-4,17 - pregnadiene monohydroiodide.

No references cited.